(12) United States Patent
Ianev et al.

(10) Patent No.: US 10,341,416 B2
(45) Date of Patent: Jul. 2, 2019

(54) CONTROL OF SMALL DATA TRANSMISSION IN A MOBILE RADIO COMMUNICATIONS NETWORK

(71) Applicant: NEC Corporation, Tokyo (JP)

(72) Inventors: Iskren Ianev, Berkshire (GB); Yannick Lair, Berkshire (GB); Hayato Haneji, Berkshire (GB)

(73) Assignee: NEC Corporation, Tokyo (JP)

( * ) Notice: Subject to any disclaimer, the term of this patent is extended or adjusted under 35 U.S.C. 154(b) by 41 days.

(21) Appl. No.: 15/031,482

(22) PCT Filed: Oct. 22, 2014

(86) PCT No.: PCT/JP2014/005350
§ 371 (c)(1),
(2) Date: Apr. 22, 2016

(87) PCT Pub. No.: WO2015/059925
PCT Pub. Date: Apr. 30, 2015

(65) Prior Publication Data
US 2016/0249155 A1    Aug. 25, 2016

(30) Foreign Application Priority Data
Oct. 25, 2013   (GB) .................................. 1318901.4

(51) Int. Cl.
*H04L 29/08*    (2006.01)
*H04W 76/18*    (2018.01)
(Continued)

(52) U.S. Cl.
CPC .............. *H04L 67/06* (2013.01); *H04W 4/70* (2018.02); *H04W 76/18* (2018.02); *H04W 48/02* (2013.01)

(58) Field of Classification Search
CPC .................................................... H04W 4/005
See application file for complete search history.

(56) References Cited

U.S. PATENT DOCUMENTS

2012/0254890 A1* 10/2012 Li .................... H04W 4/005
                                                                719/313
2013/0012204 A1   1/2013 Kim et al.
(Continued)

FOREIGN PATENT DOCUMENTS

EP    2 566 199 A1    3/2013
EP    2 584 805 A2    4/2013
(Continued)

OTHER PUBLICATIONS

3GPP TSG SA WG3 (Security) Meeting #72, S3-130861, NEC Corporation, "pCR: Modification to MTC-IWF based security solution for small data transmission", XP050727222, (2013).*

(Continued)

*Primary Examiner* — Suraj M Joshi
(74) *Attorney, Agent, or Firm* — Finnegan, Henderson, Farabow, Garrett & Dunner, L.L.P.

(57) ABSTRACT

A mobile radio communications network within which a mobile radio communications device is to operate with access to a Small Data Transmission (SDT) feature is disclosed. The network includes a first network device arranged to receive SDT signalling initiated by the mobile radio communications device and a second network device arranged to receive signalling from the first network device as part of an establishment procedure for attempted SDT communications, the first network device being further arranged to determine if SDT should be prevented for the mobile radio communications device and responsive to its signalling exchange with the second network device, and to initiate a SDT rejection message for use in the control of the mobile radio communications device if SDT is to be prevented.

20 Claims, 7 Drawing Sheets

(51) Int. Cl.
*H04W 4/70* (2018.01)
*H04W 48/02* (2009.01)

(56) References Cited

U.S. PATENT DOCUMENTS

2013/0044708 A1 2/2013 Kim et al.
2013/0079006 A1* 3/2013 Cho .................. H04W 8/06
455/435.1

FOREIGN PATENT DOCUMENTS

| WO | WO 2013/006219 A1 | 1/2013 |
| WO | WO 2013/009008 A1 | 1/2013 |
| WO | WO 2013/114492 A1 | 8/2013 |

OTHER PUBLICATIONS

International Search Report and Written Opinion dated Dec. 22, 2014, in corresponding PCT International Application.
3GPP TS 22.368 V12.2.0, 3$^{rd}$ Generation Partnership Project; Technical Specification Group Services and System Aspects; Service requirements for Machine-Type Communications (MTC); Stage 1 (Release 12), Mar. 2013.
3GPP TR 23.887 V1.3.0, 3$^{rd}$ Generation Partnership Project; Technical Specification Group Services and System Aspects; Machine-Type and other mobile data applications Communications enhancements (Release 12), Nov. 2013.
3GPP TSG RAN WG2 Meeting #83, R2-133033, "Reply LS on requesting further input on MTCe solution 5.1.2.3.1", Aug. 2013.
3GPP TS 23.682 V11.5.0, 3$^{rd}$ Generation Partnership Project; Technical Specification Group Services and System Aspects; Architecture enhancements to facilitate communications with packet networks and applications (Release 11), Sep. 2013.
Search Report issued in the Priority GB Application dated May 28, 2014.
Notification of Reason for Refusal issued by the Japanese Patent Office in counterpart Japanese Patent Application No. 2016-521363, dated Apr. 11, 2017.
3GPP TSG-SA WG2 Meeting #79E (Electronic), TD S2-103192, KPN, "Enforcement of back-off time", Elbonia, pp. 2-6, (2010) URL:http://www.3gpp.org/ftp/tsg_sa/WG12_Arch/TSGS2_79E_Elbonia/Docs/S2-103192.zip.
Extended European Search Report issued by the European Patent Office in counterpart European Patent Application No. 14856075:8-1870, dated Apr. 25 2017.
3GPP TSG SA WG3 (Security) Meeting #72, S3-130861, NEC Corporation: "pCR: Modification to MTC-IWF based security solution for small data transmission", XP050727222, 3rd Generation Partnership Project (3GPP),Qingdao, China, 7 pages, (2013).
SA WG2 TD Meeting #92, S2-122731, Panasonic: "MT SMS rejection during SGSN/MME control of overload", XP050633264, 3rd Generation Partnership Project (3GPP), Barcelona, Spain, 3 pages, (2012).
SA WG2 TD Meeting #93, S2-123813, Qualcomm Incorporated: "Signalling overhead reduction for small data transmission over user plane (LTE)", XP050683518, 3rd Generation Partnership Project (3GPP); Sofia, Bulgaria, 8 pages, (2012).

* cited by examiner

[Fig. 1]
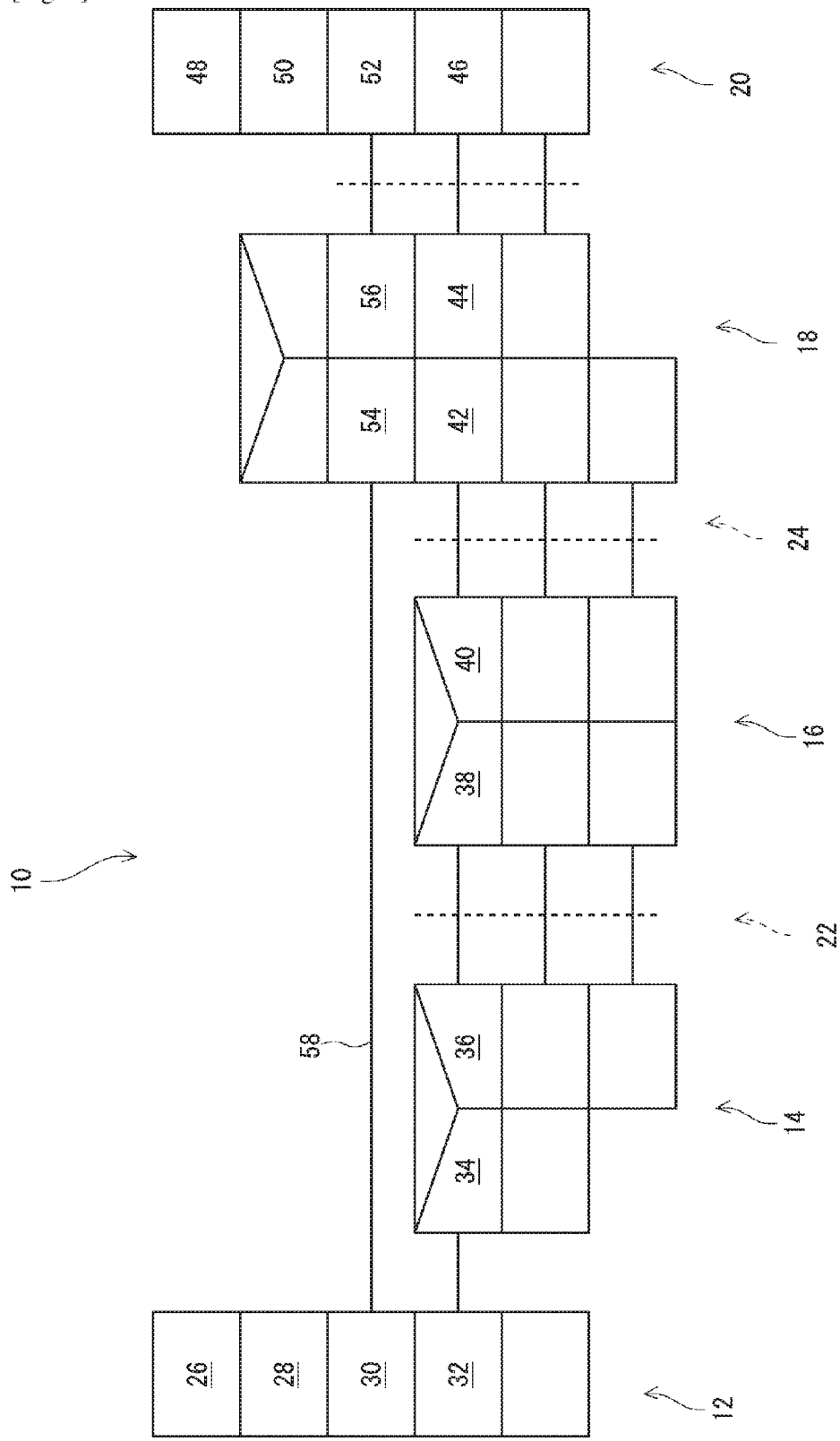

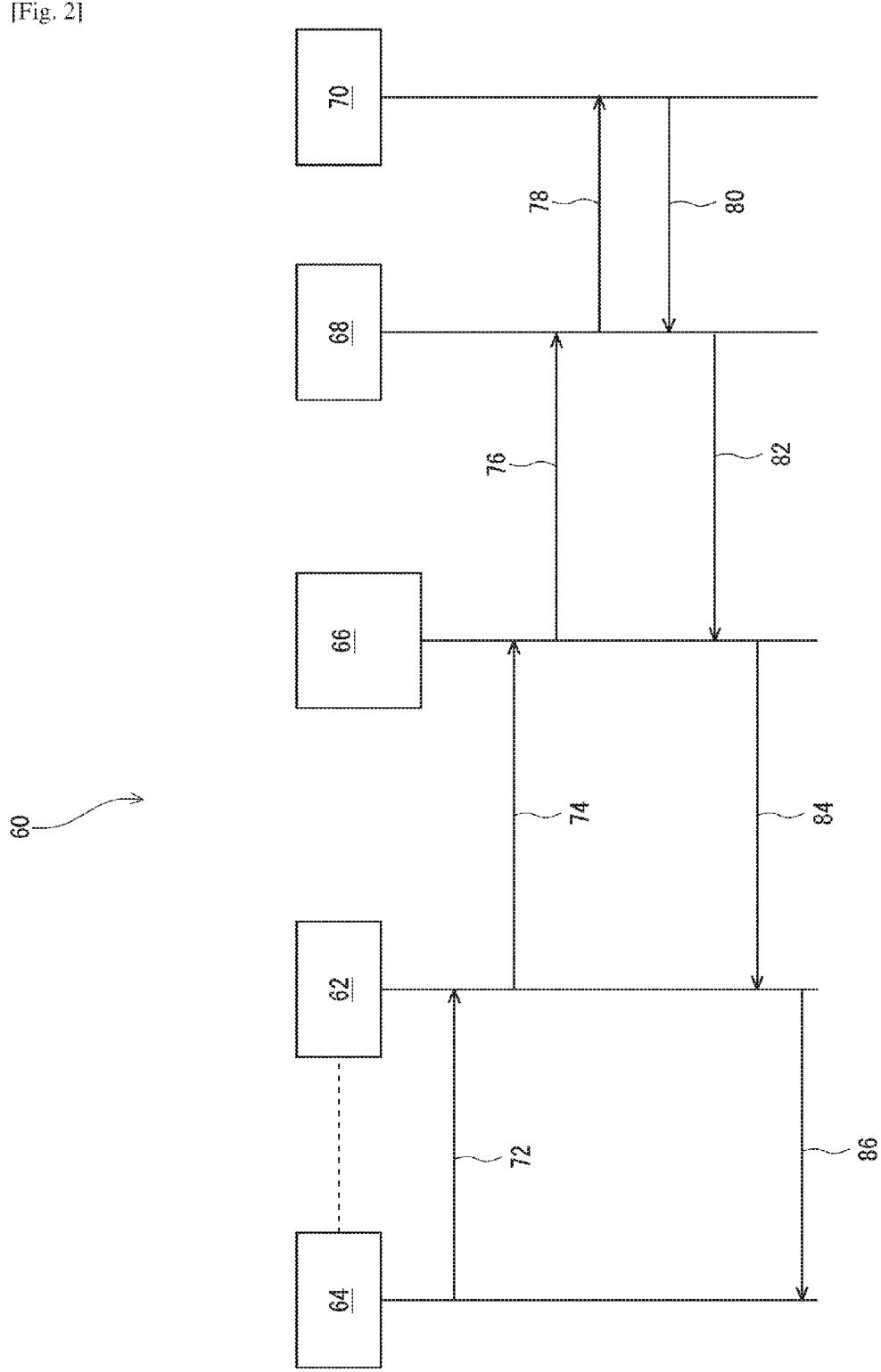
[Fig. 2]

[Fig. 3]
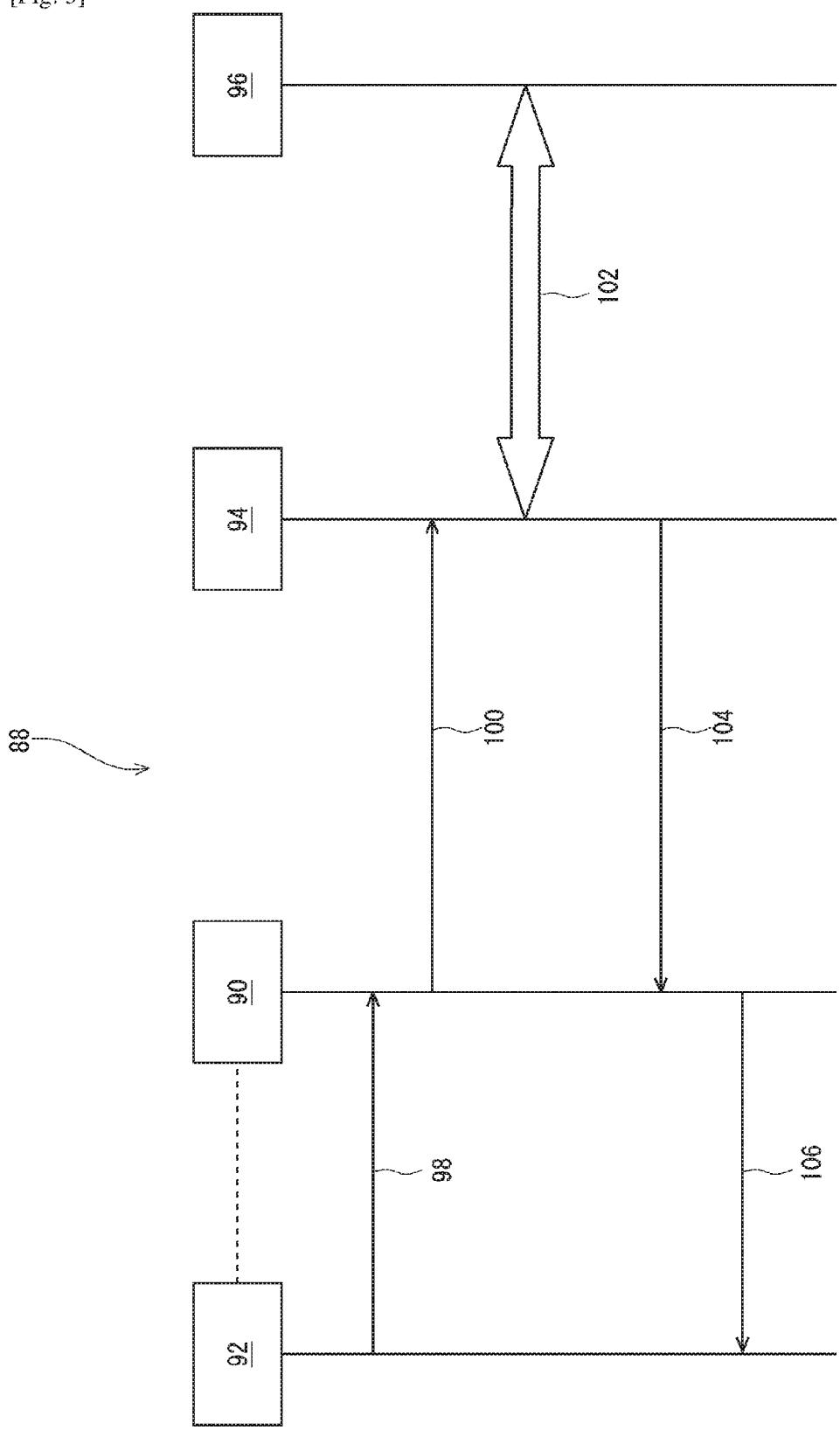

[Fig. 4]
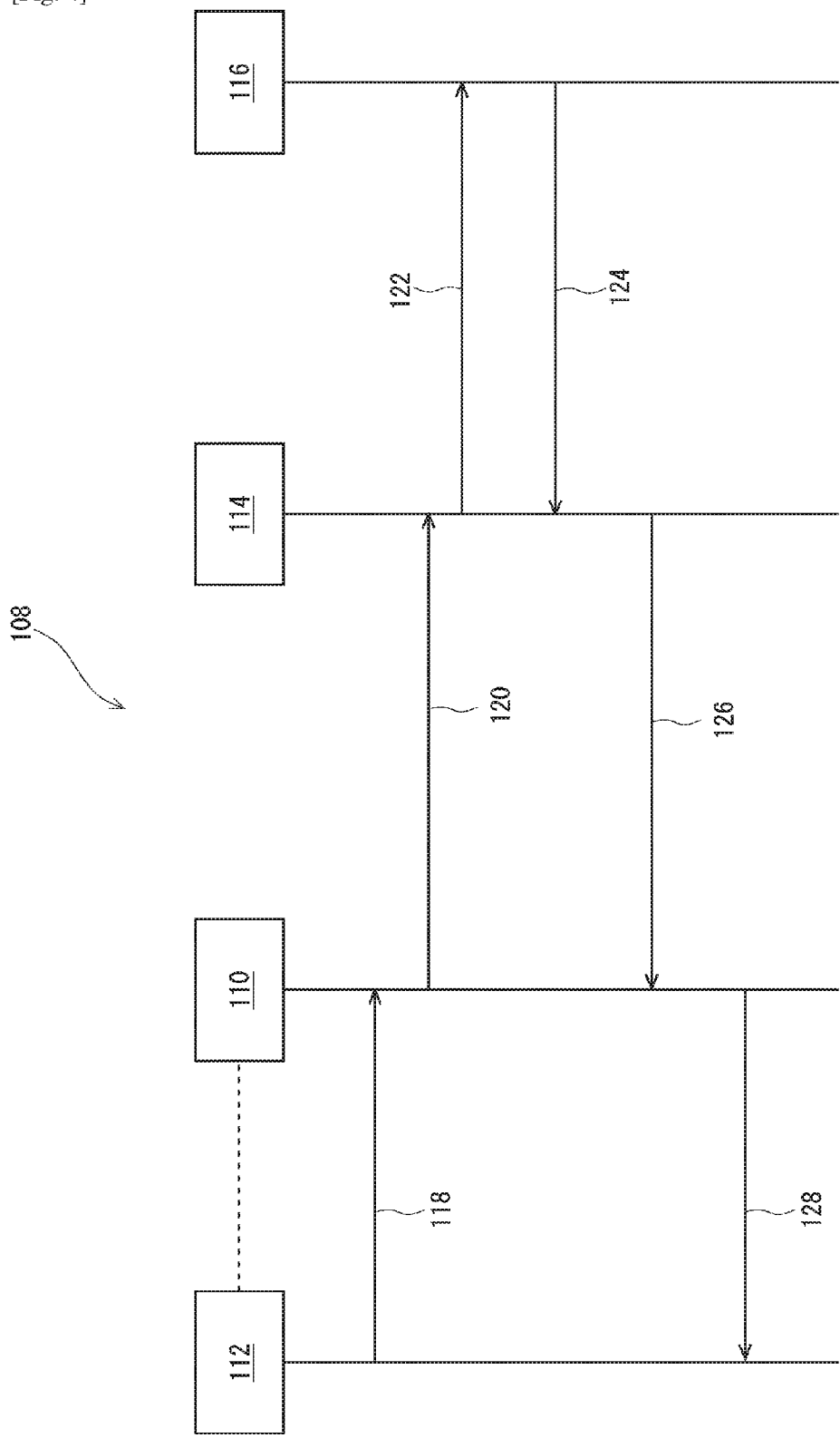

[Fig. 5]
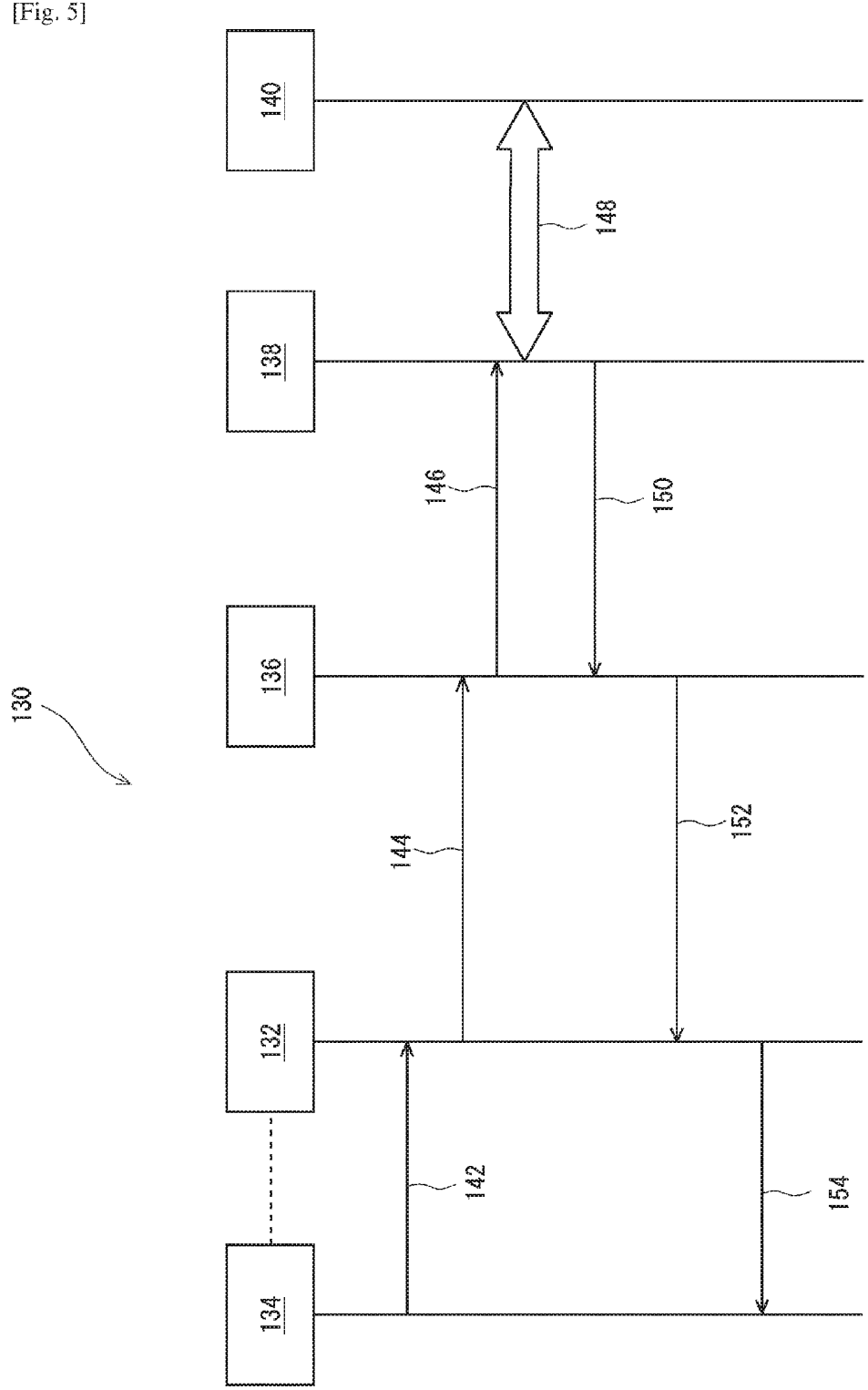

[Fig. 6]
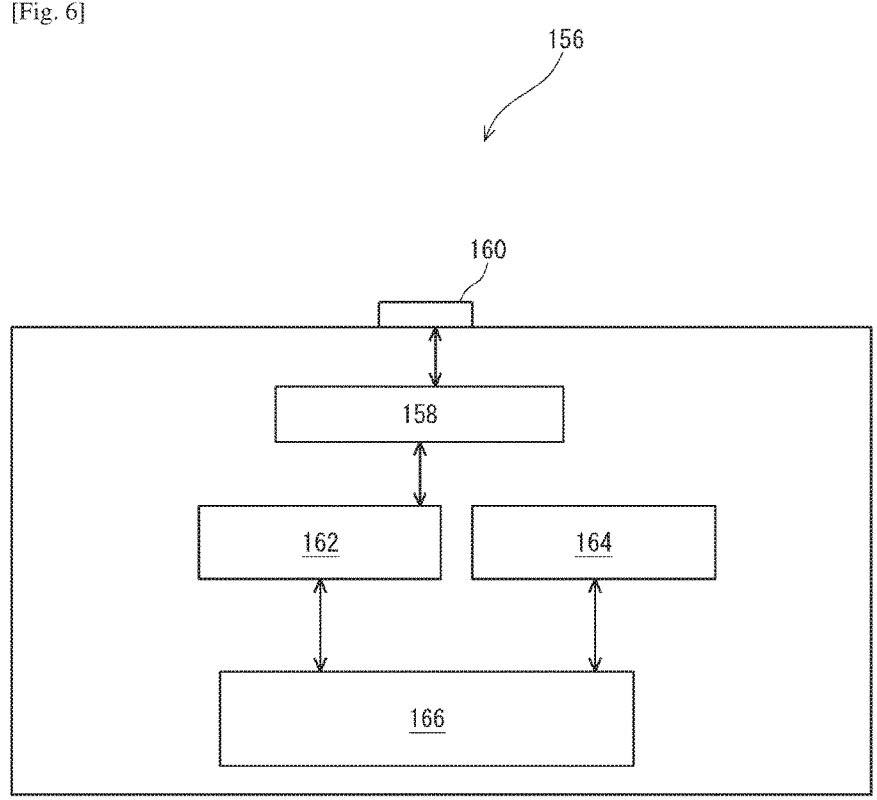

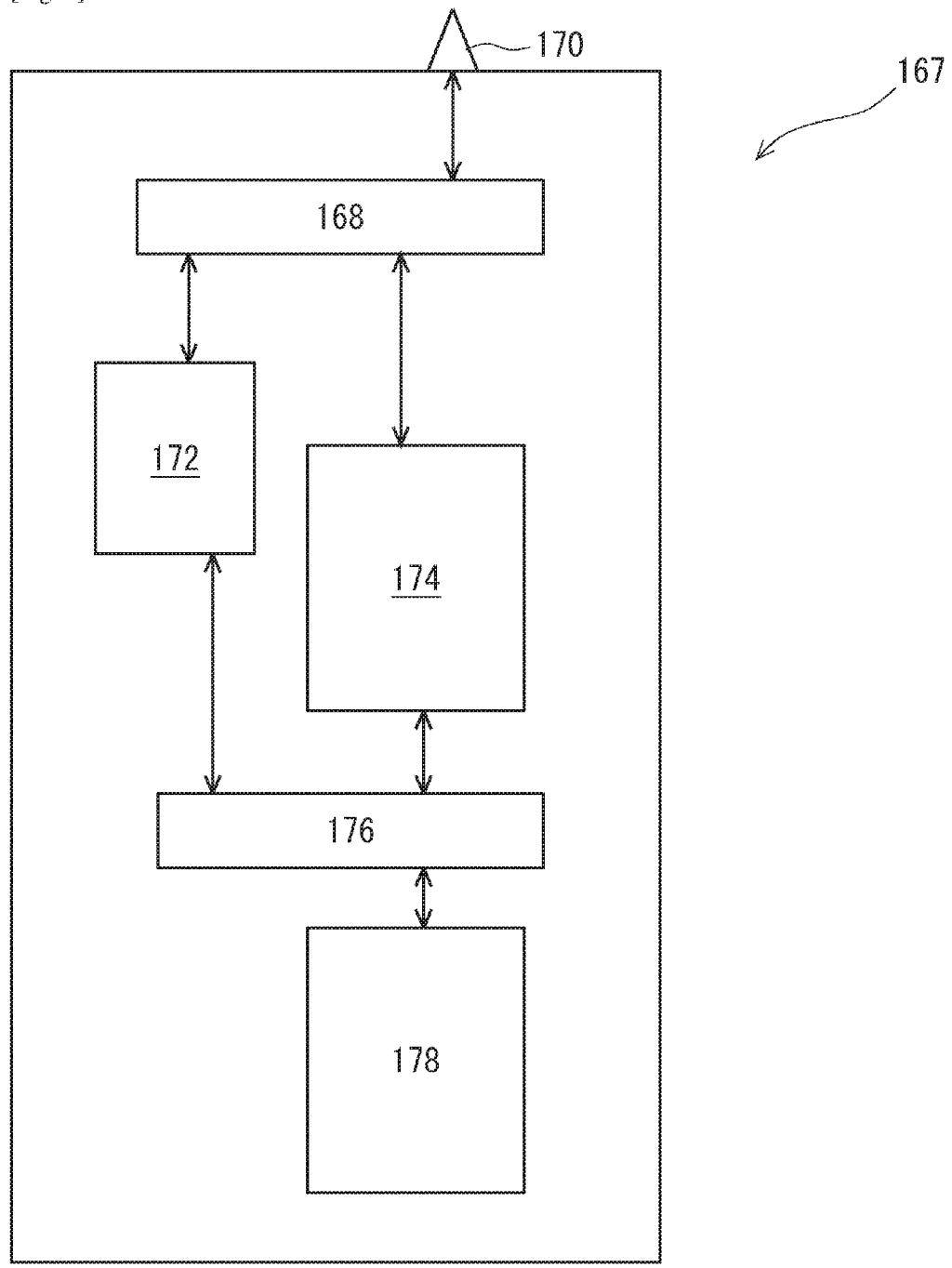
[Fig. 7]

CONTROL OF SMALL DATA TRANSMISSION IN A MOBILE RADIO COMMUNICATIONS NETWORK

CROSS-REFERENCE TO RELATED PATENT APPLICATIONS

This application is a National Stage Entry of International Application No. PCT/JP2014/005350, filed Oct. 22, 2014, which claims priority from GB 1318901.4, filed Oct. 25, 2013. The entire contents of the above-reference applications are expressly incorporated herein by reference.

TECHNICAL FIELD

The present invention relates to a mobile radio communications network and related network device and methods of operation offering network communication by way of a Small Data Transmission (SDT) feature.

BACKGROUND ART

Communication procedures within mobile radio communications network can involve amounts of data of various signals and recent discussion within 3GPP (3rd Generation Partnership Project) documentation in particular has focused on the transmission of small amounts of data by way of SDT features and services.

Many Machine Type Communication (MTC) applications send or receive small amounts of data. 3GPP Services and Systems Aspects (SA1) Working Group has already identified SDT as one possibly attractive feature for MTC. According to Technical Specification document TS22.368, s7.2.5, the MTC Feature 'Small Data Transmission' is intended for use with MTC Devices that send or receive small amounts of data and the size of many of the instances of data exchange is on the order of 1 k (1024) octets.

Also, 3GPP Services and System Aspects (SA2) Working Group has considered Small Data Transmission optimisation as part of the MTCe-SDDTE (Small Data and Device Triggering Enhancements) Work Item, as discussed in particular as section 5.1 of the Technical Report TR23.887. One key issue identified is the desire to 'Efficient Small Data transmission' and the following functional requirement for Small Data transmission has been determined, i.e. systems should support transmissions of small amounts of data efficiently with minimal network impact such as signalling overhead, network resources and delay for reallocation.

3GPP SA2 Working Group has already agreed several suggested solutions for such efficient transmissions are known from TR23.887.

Also, during its last meeting (SA2#98, July 2013) SA2 recommended 'Standalone Small Data Service with T5/Tsp and generic NAS (Non-Access Stratum) transport' for standardisation and identify a protocol for SDT to carry small data units of various users of that small data service was agreed and which spans between service accesses points in the User Equipment UE device and the SCS/AS (Service Capability Server/Application Server). As discussed further below with reference to FIG. 1, any service data exchange between the UE and Application Server (AS) is intended to go through the MTC-IWF (Machine Type Communication-Interworking Function) and the SCS. The small data transfer can be provided as confirmed or unconfirmed delivery service.

An Illustration known from TR23.887, of uplink Small Data Transmission (SDT) through control plane channel on T5 and Tsp interfaces is also discussed further below with reference to FIG. 2.

However, such suggested protocol details are not fully defined and so are incomplete.

Although an existing protocol could be adopted for the SDT protocol, there are many new and specific requirements that would make simple adoption of current protocols inappropriate. One such specific issue is how to control the use of SDT at the both sides, the UE and the network. Indeed an Editor's Note in the TR23.887 confirms that the manner of ensuring that the application correctly uses the Service Request procedure and does not abuse this 'Small Data' NAS procedure is an open issue. However the MME's (Mobile Management Entity) ability to release the connection provides a control point.

Yet further in its Liaison Statement (LS) answer to (R2-133033) SA2, RAN 2 Working Group has suggested that it is essential to ensure that only traffic matching small data feature characteristics can use SDT solution since the use with other traffic patterns would result in deterioration in capacity and performance.

It is also noted that, while with the normal data transmission there is an initial PDP/PDN (Packet Data Protocol/Packet Data Networks) connection establishment that could be rejected, with a SDT service there is no PDP/PDN connection establishment that occurs before sending the SDT.

SUMMARY OF INVENTION

Technical Problem

Although this all suggests the need for tighter control in the use of SDT services and features, and requires means for rejection of the SDT service if not compliant with the requirements or for any other reason like subscription, traffic, deployment, equipment failure and etc, no effective solutions exist.

The present invention seeks to provide for a mobile radio communications network, a network device and associated methods of operation having advantages over known such networks, devices and methods.

In particular, the present invention seeks to provide for the control of the use of SDT features in an advantageously efficient manner and, particularly, through the efficient and reliable rejection of an SDT service request/attempt through appropriate control and restriction.

Solution to Problem

According to a first aspect of the present invention, there is provided a mobile radio communications network within which a mobile radio communications device is to operate with access to a Small Data Transmission feature and including a first network device arranged to receive Small Data Transmission signalling initiated by the mobile radio communications device, a second network device arranged to receive signalling from the first network device as part of an establishment procedure for attempted Small Data Transmission communications for the mobile radio communications device within the network, the first network device being further arranged to determine if Small Data Transmission should be prevented for the mobile radio communications device and to initiate a Small Data Transmission rejection message for use in the control of the mobile radio communications device if Small Data Transmission is to be prevented.

Preferably, the first network device is arranged to determine if the Small Data Transmission should be prevented responsive to its signalling exchange with the second network device.

Advantageously, the first network device includes a SGSN/MME (Serving GPRS (General Packet Radio Service) Support Node/Mobile Management Entity).

Further, the second network device can include a server device such as, for example, a Home Subscriber Server (HSS).

Advantageously, the signalling exchange between the first network device and second network device as part of the establishment procedure includes an interrogation signal sent from the first network device to the second network device preferably for identification of a Small Data Transmission Receiver Id.

In one particular exemplary embodiment, the network arrangement is such that the Small Data Transmission rejection message is sent directly from the first network device to the mobile radio communications device.

In an alternative arrangement, the first network device can include a MTC-IWF device.

In this manner, the second network device can again include a server device such as, for example, a Service Capability Server/Application Server (SCS/AS). Also, the signalling exchange arising within the network, can be arranged such that the signalling exchange between the first and second network devices includes authorizing/authentication signalling between the MTC-IWF and the SCS/AS.

As a further option, and with the network device including the MTC-IWF, the second network device can include an HSS and the network can be arranged such that the signalling exchange between the first and second network devices includes interrogation signalling directed to the HSS as discussed above.

Advantageously, the Small Data Transmission rejection message from the MTC-IWF is delivered to the mobile radio communications device by way of a further network device, and advantageously the further network device can include a SGSN/MME.

Advantageously, the Small Data Transmission rejection message can include an indication of the cause of rejection. Further, the mobile radio communications device can be arranged upon receipt of the Small Data Transmission rejection message to generate a transfer rejection signal for delivery to an application operating therein and seeking network access by way of a Small Data Transmission feature.

Further, the network can be arranged such that a Small Data Transmission rejection message received at the mobile radio communications device includes time-period information serving to control a length of time for which a mobile radio communications device cannot access the Small Data Transmission feature.

According to another aspect of the present invention, there is provided a method of controlling use of a Small Data Transmission feature within a mobile radio communications network within which a mobile radio communications device is to operate with access to a Small Data Transmission feature, the method including the steps of receiving at a first network device Small Data Transmission signalling initiated by the mobile radio communications device, receiving at a second network device signalling from the first network device as part of an establishment procedure for attempted Small Data Transmission communications for the mobile radio communications device in the network, by determining at the first network device if Small Data Transmission should be prevented for the mobile radio communications device and initiating a Small Data Transmission rejection message for use in the control of a mobile radio communications device if Small Data Transmission is to be prevented.

Preferably, the method includes determining if the Small Data Transmission should be prevented responsive to its signalling exchange with the second network device.

Again, the invention proves advantages in providing improved control of employment of a Small Data Transmissions service and with a mobile radio communications network having the functionality, by way of one or more devices, to reject a Small Data Transmission service request/attempt, in certain circumstances.

The first network device employed within the method can includes a SGSN/MME.

Further, the second network device employed within the method can include a server device such as, for example, a Home Subscriber Server (HSS). Advantageously, the signalling exchange between the first network device and second network device as part of the establishment procedure can includes an interrogation signal sent from the first network device to the second network device for seeking a Small Data Transmission Receiver Id.

In one particular exemplary embodiment, the method includes sending the Small Data Transmission rejection message directly from the first network device to the mobile radio communications device.

In an alternative arrangement, the first network device employed by the method can include a MTC-IWF device.

In this manner, the second network device employed by the method can again include a server device such as, for example, a Service Capability Server/Application Server (SCS/AS).

The signalling exchange arising within the network as part of the establishment procedure can include authorizing/authentication signalling between the MTC-IWF and the SCS/AS.

As a further option, and with the network device including the MTC-IWF, the second network device can include a HSS and the network is arranged such that the signalling exchange forming part of the establishment procedure includes interrogation signalling directed to the HSS as discussed above.

Advantageously, method includes delivering the Small Data Transmission rejection message from the MTC-IWF to the mobile radio communications device by way of a further network device.

The further network device employed by the method can include a SGSN/MME.

Advantageously, the Small Data Transmission rejection message can include an indication of the cause of rejection. Further, the mobile radio communications device can be arranged upon receipt of the Small Data Transmission rejection message to generate a transfer rejection signal for delivery to an application operating therein and seeking network access by way of a Small Data Transmission feature.

Further, the network can be arranged such that a Small Data Transmission rejection message received at the mobile radio communications device includes time-period information serving to control a length of time for which a mobile radio communications device cannot access the Small Data Transmission feature.

According to yet another aspect of the present invention, there is provided a mobile radio communications network device arranged to receive Small Data Transmission signalling from a mobile radio communications device and to send signalling to a second mobile radio communications network device as part of an establishment procedure for attempted Small Data Transmission communication for the mobile radio communications device within the network, the mobile radio communications network device further being arranged to determine if a Small Data Transmission should be prevented for the mobile radio communications device and to initiate a Small Data Transmission rejection message for use in the control of the mobile radio communications device if Small Data Transmission is to be prevented.

Preferably, the mobile radio communications network device is arranged to determine if the Small Data Transmission should be prevented responsive to its signalling exchange with the second network device.

As above, the mobile radio communications network device can include a SGSN/MME.

Further, the network device can be arranged to send an interrogation signal to the second network device as part of the signalling exchange.

In one particular exemplary embodiment, the mobile radio communications network device is arranged to send the Small Data Transmission rejection message directly to the mobile radio communications device.

In an alternative arrangement, the mobile radio communications network device can include a MTC-IWF device.

In this manner, the signalling exchange between the mobile radio communication network devices can include authorizing/authentication signalling between the MTC-IWF and a SCS/AS.

As a further option, the signalling exchange between the mobile radio communications network devices can include interrogation signalling directed to an HSS within the network.

According to yet another aspect of the present invention, there is provided a method of operating a mobile radio communications network device to receive a Small Data Transmission from a mobile radio communications device operating within the network and with access to a Small Data Transmission service, the method including the step of receiving Small Data Transmission signalling initiated by the mobile radio communications device, sending, as part of a signalling exchange, signalling to a second mobile radio communications network device as part of the establishment procedure for attempted Small Data Transmission communication for the mobile radio communications device determining if the Small Data Transmission should be prevented for the mobile radio communications device and initiating a Small Data Transmission rejection message for use in the control of the mobile radio communication device if Small Data Transmission is to be prevented.

Preferably, the method includes determining if the Small Data Transmission should be prevented responsive to its signalling exchange with the second network device.

Advantageously, the signalling exchange within the method between the network devices can include an interrogation signal sent from the mobile radio communications network device to the second mobile radio communications network device.

Preferably, the interrogation signal can include one seeking to obtain Small Data Transmission Receiver Id data.

In one particular exemplary embodiment the method of control is one such that the Small Data Transmission rejection message is sent directly from the first network device to the mobile radio communications device.

Alternatively, the signalling exchange arising in relation to the method within the network can include an authorizing/authentication signalling exchange.

Further, the signalling exchange can include interrogation signalling directed to an HSS.

It will of course be appreciated that the present invention provides for a mobile radio communications device arranged for receiving control signalling relating to access to a Small Data Transmission feature and as originating within a mobile radio communications network, and from a mobile radio communications network device, as outlined above. It should be appreciated that methods and devices of the present invention, and related network, can be arranged to include cause of rejection within the rejection signalling and including and indication of at least one of a subscriber-related cause or a non-subscriber related cause.

Advantageous Effects of Invention

The invention proves advantages in providing efficient and adaptable control of the employment availability of a Small Data Transmissions service by/for a mobile radio communications device; the device having the functionality to reject a Small Data Transmission service request/attempt if appropriate.

BRIEF DESCRIPTION OF DRAWINGS

FIG. 1 is a schematic illustration of protocol stack structures for network nodes within a mobile radio communications network arranged for adopting a Small Data Transmission service.

FIG. 2 is a signalling diagram illustrating one example of a proposed uplink Small Data Transmission procedure.

FIG. 3 is a signalling diagram illustrating control signalling in accordance with one exemplary embodiment of the present invention.

FIG. 4 is a signalling diagram illustrating control signalling in accordance with another exemplary embodiment of the present invention.

FIG. 5 is a signalling diagram illustrating control signalling in accordance with a yet further exemplary embodiment of the present invention.

FIG. 6 is a schematic diagram of a mobile radio communications network device according to an exemplary embodiment of the present invention.

FIG. 7 is a schematic illustration of a mobile radio communications device for operation in accordance with one exemplary embodiment of the present invention.

DESCRIPTION OF EMBODIMENTS

Exemplary embodiments of the invention will be described further hereinafter, by way of example only, with reference to the accompanying drawings.

Turning first to FIG. 1, there is provided a schematic illustration of nodes within a mobile radio communications network 10 and including a User Equipment (UE) device 12, a Mobile Management Entity (MME) 14, a Machine Type Communication-Interworking Function (MTC-IWF) 16, a Service Capability Server (SCS) 18 and Application Server (AS) 20.

The MTC-IWF 16 is arranged to interface with the MME 14 by way of a T5 interface protocol 22, and to interface with the SCS 18 by way of a Tsp interface protocol 24.

For ease of reference not all layers of the protocol stacks within each of the devices 12-20 are identified but, as a generality, the protocol stack of the UE 12 includes application layer 26, SDT user layer 28, SDT layer 30 and Non-Access Stratum (NAS) layer 32.

The relaying function of the MME 14 is provided by way of an NAS layer 34, T5 interface Application Protocol layer 36. The MTC-IWF relaying functions are achieved by way of T5 interface Application Protocol layer 38 and also a Tsp interface Application Protocol layer 40 connecting, by way of the Tsp interface 24 to a Tsp application protocol layer 42 within the SCS 18. The SCS 18 includes a Transmission Control Protocol (TCP) layer 44 and also a SDT layer 54 and Transport Layer Security (TLS) layer 56.

The protocol stack of the AS 20 includes an application layer 48, HTTP (Hyper Text Transport Protocol) layer 50, TLS layer 52 and TCP layer 46.

As will be appreciated, the SDT protocol is arranged to span 58 between service access points in the UE 12 and the SCS 18/AS 20. As also illustrated, any service data exchanges between the UE 12 and the AS 20 are required to pass through the MME 14, MTC-IWF 16 and the SCS 18 as indicated and the small data transfer can be provided as a confirmed or unconfirmed delivery service.

By way of further illustration of the proposed protocol for SDT service features reference is now made to FIG. 2 which illustrates uplink SDT through a control plane channel on the T5 and Tsp interfaces and as proposed in 3GPP Technical Report TR23.887. Details of Radio Resource Control (RRC) and NAS security handling are not specifically shown but should be considered as an implicit part of the procedure shown.

The signalling illustrated is within a network environment 60 including a mobile radio communications device such as a User Equipment (UE) 62 with its associated Application(s) 64, a SGSN/MME 66, MTC-IWF 68 and SCS/AS 70.

First, an application 64 of the UE 62 requests 72 the transfer of an SDT-PDU (Packet Data Unit) and performs any desired security functions, such as integrity protection of the PDU.

A SDT-PDU is sent in an NAS message 74 to the SGSN/MME 66 and the protocol type of the NAS PDU is set to "SDT". The SDT-PDU includes header and payload data. Within the header, if not already done by the application, the UE 62 fills the "SENDER" field with its MSISDN (Mobile Station International ISDN Number) (if known) or External ID (if known) and places SCS/AS ID in the "RECEIVER" field. The sub address field can include the identity of the application and the UE 62 can perform any required security functions, i.e. integrity protection and/or encryption, if not already done by the application.

Upon receiving the SDT-PDU, the SGSN/MME 66 verifies the sender ID. If the SDT-PDU contains no sender ID, the SGSN/MME 66 adds a sender ID and if the subscription doesn't require home-routing, the SGSN/MME 66 (not shown) determines the destination for the SDT-PDU by interrogating the Home Subscriber Server (HSS) for the SDT Receiver ID and thereby determines the appropriate MTC-IWF. If the subscription requires home-routing, the SGSN/MME 66 determines the appropriate MTC-IWF from the UE's IMSI (International Mobile Subscriber Identity) or sender ID. The SGSN/MME 66 then sends 76 the SDT-PDU to the MTC-IWF 68 over T5 interface using the T5-AP protocol.

The MTC-IWF 68 then determines the SCS/AS 70 using the 'RECEIVER ID' field in the SDT-PDU header, and forwards 78 the SDT-PDU or SDU to the SCS/AS 70 using Tsp-AP. Before forwarding the message, however, the MTC-IWF 68 replaces IMSI (if indicated as sender ID) with MSISDN or External ID as 'SENDER ID'.

Upon receiving the SDT-PDU the SCS/AS 70 may verify the message integrity. The SCS/AS 70 then returns an appropriate response 80, i.e. a Tsp-AP-PDU-Ack to confirm the Tsp transfer of the SDT-PDU or the SDU, if an acknowledgment is requested.

If such an acknowledgement is requested, the MTC-IWF 68 sends a T5-PDU-Ack 82 to the SGSN/MME 66.

The SGSN/MME 66 then sends an NAS-PDU-Ack 84 to the UE 62 and the UE 62 confirms 86 the SDT-PDU or the SDU transfer to the application 64.

However, and as already discussed above, the proposed protocol illustrated with reference to FIGS. 1 and 2 is still lacking in detail and there are disadvantages identified as discussed above in considering the adoption of existing protocols.

It is important to achieve, in a reliable and efficient manner the appropriate level of control and restriction as regards the employment of SDT by a UE within a network so as, not least, to avoid loss of network capacity and network performance that might arise with a mismatch between network traffic and SDT features.

Turning now to FIG. 3, there is provided a signalling diagram illustrating signalling arising within a network relating to the control of use of a SDT feature by way of an SGSN/MME network node and according to one exemplary embodiment of the present invention.

Here a network environment 88 including a UE 90 and associated application(s) 92 is illustrated along with a SGSN/MME 94 and HSS 96.

The signalling commences with an application 92 of the UE 90 requesting 98 the transfer of an SDT-PDU. The application 92 can perform any wanted security functions, e.g. integrity protection such as suggested by 3GPP Technical Report TR23, 887.

The SDT-PDU is then sent in a NAS message 100 to the SGSN/MME 94 and the protocol type of the NAS-PDU is set to "SDT".

Upon receiving the SDT-PDU, the SGSN/MME 94 determines the destination for the SDT-PDU by interrogating 102 the HSS 96 for the SDT Receiver Id and so as to identify the appropriate MTC-IWF (not shown). However, there is a possibility that the SDT service is not allowed by the PLMN (Public Land Mobile Network) (for example, during roaming the visiting PLMN may not allow SDT service) or that the SDT service is barred (for reasons like pending payment or abuse of the service). If so, the SGSN/MME 94 would be updated with this information during the HSS interrogation 102.

As a result of the HSS interrogation 102 the SGSN/MME 94 can reject the SDT service by sending back a NAS-PDU-Reject message 104, ideally with one of the following service reject causes:

Service option not supported—This reject cause can be used by the SGSN/MME 94 when the UE 90 requests a SDT service which is not supported by the PLMN. On receiving NAS-PDU-Reject message 104 with reject-cause='Service option not supported', the UE 90 shall deactivate the SDT procedure (by entering an SDT transfer inactive state, for example) and shall not trigger another SDT service while on this PLMN. The UE 90 may indicate the result to the SDT Application by sending Transfer Reject message and include inside the reject cause.

Requested service option not subscribed—This reject cause can be sent by the SGSN/MME 94 when the UE requests a SDT service for which it has no subscription. On receiving NAS-PDU-Reject message with reject cause='Requested service option not subscribed', the UE 90 shall deactivate the SDT procedure and shall not allow for another SDT service from that SDT Application. The UE 90 may indicate the result to the SDT Application by sending Transfer Reject message and include inside the reject cause.

Operator Determined Barring—This reject cause is used by the SGSN/MME to indicate that the SDT service was rejected due to Operator Determined Barring. On receiving NAS-PDU-Reject message with reject cause='Operator Determined Barring', the UE 90 shall deactivate the SDT procedure and shall not allow for another SDT service from that SDT Application until the barring is lifted. The UE 90 may indicate the result to the SDT Application by sending Transfer Reject message and include inside the reject cause.

Finally, the UE 90 can indicate the SDT procedure rejection to the Application 92 that has initiated the SDT request by sending a Transfer Reject message 106 including the reject-cause, the sdt-back-off-timer (if any) and the sdt-pdu-id in case there are multiple active SDT procedures by that Application 92.

It is also possible that the SGSN/MME 94 can employ the new NAS-PDU-Reject message 104 to also reject for other, non-subscription related reasons with the following reject causes:

Insufficient Resources—This reject cause is used to indicate that the requested SDT service cannot be provided due to insufficient resources.

Service option temporarily out of order—This reject cause is sent when the network cannot service the request SDT service because of temporary outage of one or more functions required for supporting the service.

Network failure—This reject cause is used to indicate that the requested SDT service was rejected due to an error situation in the network.

One possible UE 90 reaction when receiving the reject indication 104 could be as follows:

On receiving NAS-PDU-Reject message with one of the above reject causes, the UE 90 deactivates the SDT procedure (by entering an SDT transfer inactive state, for example). If the SGSN/MME 94 included a value for the sdt-back-off-timer, the UE 90 shall not trigger another SDT procedure for the duration of this timer. Also, the UE 90 shall send Transfer Reject message to the SDT application for which the service was rejected and include in it the reject-cause, sdt-back-off-timer (if any) and the sdt-pdu-id (if multiple SDT procedures by that Application).

It should also be appreciated that any other, either new or existing, messages such as UPLINK NAS TRANSPORT REJECT for SDT service rejection can be included as part of exemplary embodiments such as that discussed above.

Turning now to FIG. 4, there is provided a signalling diagram for signalling arising within a network environment 108 in which a UE 110 and its associated Application 112 and according to another exemplary embodiment of the present invention in which SDT service rejection is initiated by the MTC-IWF. Other network elements illustrated therefore are a SGSN/MME 114 and MTC-IWF 116. The signalling again commences with a transfer request 118 from the Application 112 to the UE 110, and then a NAS message 120 from the UE 110 to the SGSN/MME 114, which in turn sends the SDT-PDU 122 over the T5-AP interface to the MTC-IWF 116.

As part of this exemplary embodiment, it should be appreciated that upon receiving a T5-AP-PDU message, a MTC-IWF determines the SCS/AS using the Receiver Id field in the SDT-PDU header and forwards the SDT-PDU or SDU to the SCS/AS using the Tsp_AP. Before forwarding the message, the MTC-IWF replaces IMSI (if used as a sender Id) with MSISDN or external Id as Sender Id on the Tsp interface as discussed above in relation to FIG. 2. However, some problems can arise in the selection of the SCS/AS by the MTC-IWF. In 3GPP Technical Specification TS23.682, Annex A it is noted that the deployment of a SCS may be inside or outside the operator domain. When the SCS/AS node is part of the operator domain, the SCS/AS is considered a mobile operator internal network function, is operator controlled, and may provide operator value-added services. In this case, security and privacy protection for communication between the MTC-IWF and SCS/AS is optional.

However, when the SCS/AS is deployed outside the operator domain the SCS is MTC Service Provider controlled. In this case, security and privacy protection for communication between the MTC-IWF and SCS/AS is needed. The above-mentioned TS23.682 emphasises that MTC-IWF shall authorise the SCS/AS before communication is established.

Accordingly, and having regard to this further exemplary embodiment of the invention, if the authentication of the SCS/AS (not shown) fails, it is proposed that the MTC-IWF 116 rejects the SDT service by returning a T5-AP-Reject message 124 with a new reject-cause=SCS-authentication-failure, to the SGSN/MME 114.

On receiving the T5-AP_Reject message 124 with reject-cause=SCS-authentication-failure, the SGSN/MME 114 forwards the reject-cause to the UE 110 in a NAS-PDU-Reject message 126. The SGSN/MME 114 may also provide sdt-back-off-timer in the NAS-PDU-Reject message 126 and the SGSN/MME 114 may start SCS identification procedure for resolving any SCS access security issues. The UE 110 can send a Transfer Reject message 128 to the Application 112.

On receiving an SCS-authentication-failure, one possible UE reaction can be as follows:

the UE 110 shall deactivate the SDT procedure and if the sdt-back-off-timer is provided, the UE 110 shall not trigger another SDT procedure before expiry of the sdt-back-off-timer.

Of course, it is appreciated that the SCS/AS node selection could fail for other reasons as well, such as for technical or congestion reasons in which case the same message T5-AP-PDU_Reject message 124 could be used with general service failure causes, like:

Insufficient resources—This reject cause is used by the SCS to indicate that the requested SDT service cannot be provided due to insufficient resources.

Service option temporarily out of order—This reject cause is sent by the SCS when the network cannot service the request SDT service because of temporary outage of one or more functions required for supporting the service.

Network failure—This reject cause is used by SCS node to indicate that the requested SDT service was rejected due to an error situation in the network.

As yet a further example of the present invention, reference is made to FIG. 5 which illustrates signalling arising in connection with SDT service rejection by the MTC-IWF but, this time, with HSS interrogation similar to that as discussed in relation to FIG. 3 above.

The network environment 130 as illustrated according to this further exemplary embodiment includes a UE 132 and associated Application 134, and also SGSN/MME 136, MTC-IWF 138 and HSS 140 network nodes.

The initial signalling again includes transfer request 142, NAS 144 and SDT-PDU 146 signalling.

In this exemplary embodiment, and with the Small Data Transfer security offloaded by the SGSN/MME 136 and the related functionality moved to the MTC-IWF 138, the MTC-IWF 138 could be connected to the HSS 140. During an SDT procedure triggered by the UE 132, the MTC-IWF 138 would interrogate 148 the HSS 140 for latest subscription information related to the on-going SDT. In this case the MTC-IWF 138 would also be capable of rejecting the SDT service for subscription failures. As a result of such HSS interrogation 148 the MTC-IWF 138 would be able to reject the SDT service by sending back a T5-AP-PDU-Reject message 150 with one of the following previously described service reject causes: Service option not supported, Requested service option not subscribed, Operator Determined.

When the SGSN/MME 136 receives T5-AP-PDU-Reject message 150 the SGSN/MME 136 rejects the SDT service by sending a NAS-PDU-Reject message 152 to the UE 132 (behaviour on receiving NAS-PDU-Reject message 152 with one of the above reject causes can be as described above in relation to FIG. 3). The UE 132 can send a Transfer Reject message 154 to the Application 134.

Now turning to FIG. 6, there is provided a schematic illustration of one example of a mobile radio communications network device 156 such as, but not limited to, the SGSN/MME and the MTC-IWF as discussed above.

The device 156 includes standard transmission/reception circuitry 158 operatively connect to interface functionality 160. The device 156 also includes authentication/interrogation functionality 162 and a SDT objection message initiator 164 both of which are under the control of control functionality 166.

It will be appreciated that either one of the authentication or interrogation functionality can be provided in element 162 upon the manner in which the second mobile radio communications network device is to exchange signals with the device 156 so as to lead to generation of the SDT rejection message by way of 164 and under the control of controller 166.

With regard to FIG. 7, there is provided a schematic diagram of a UE device including a mobile radio communications device 167 embodying the present invention.

The UE device 167 includes standard transmission/reception functionality 168 operatively connected to an antenna functionality 170. As standard, the UE device 167 includes a memory 172, controller 174, processor 176 and user interface 178. In this exemplary embodiment however, the controller 174 includes an SDT controller arranged to be responsive to signalling messages received from a network device such as that illustrated in FIG. 6 and so as to inhibit access to an SDT feature within the network. The controller 174 can include means for communicating with an Application attempting to run within the device 167 there is to provide a transfer reject signal as discussed above. Also, the SDT controller 174 can include timer functionality responsive to timing information provided in the signalling from the network device and so as to limit the SDT inhibition for a particular time period.

As will be appreciated from the above, the present invention provides for the generation of control/restriction signalling within the network and for onward delivery to a mobile radio communications device so as to effectively and efficiently control the employment of a SDT feature by the mobile radio communications device when seeking network access for data transmission.

The invention can advantageously also allow for the analysis of possible failure cases in the newly defined by 3GPP SDT procedure and how to respond to such failures in the network and the UE.

For this, the invention advantageously provides for:

A message in the T5 interface between SGSN/MME and MTC-IWF-T5-AP-PDU-Reject;

A message between the UE and SGSN/MME-NAS-PDU-Reject;

A message between the UE and the SDT Application-Transfer-Reject;

A rejection cause 'SCS-authentication-failure' in the T5-AP-PDU-Reject and NAS-PDU-Reject messages;

Use of existing rejection causes in the new messages T5-AP-PDU-Reject and NAS-PDU-Reject;

A sdt-back-off-timer in the new messages NAS-PDU-Reject and Transfer Reject;

A sdt-pdu-id parameter in the NAS-PDU-Reject and Transfer-Reject messages; and

SGSN/MME behaviour at rejection of SDT service by the MTC-IWF.

However, it should be appreciated that, although discussed above primarily in relation to 3G Radio Access Technology (RAT), the present invention is not limited to application in relation to any particular RAT. For example, the inventive concept is equally applicable to 2G RATs such as GSM systems and devices. In this manner it will be appreciated that the above mentioned references to the various mobile and network devices could likewise include references to related mobile and network devices of such alternative RATs. For example, as an alternative to the above references to MME/SGSN, reference to a Mobile Switching Centre (MSC) can be considered, and as an alternative to references to an HSS, reference to a Home Location Register (HLR) can be considered.

Note that the present invention is not limited to the above-mentioned exemplary embodiments, and it is obvious that various modifications can be made by those of ordinary skill in the art based on the recitation of the claims.

The whole or part of the exemplary embodiments disclosed above can be described as, but not limited to, the following supplementary notes.

(Supplementary Note 1)

A mobile radio communications network within which a mobile radio communications device is to operate with access to a Small Data Transmission feature and comprising a first network device arranged to receive Small Data Transmission signalling initiated by the mobile radio communications device, a second network device arranged to receive signalling from the said first network device as part of an establishment procedure for attempted Small Data Transmission communications for the mobile radio communications device within the network, the first network device being further arranged to determine if Small Data Transmission should be prevented for the mobile radio communications device and to initiate a Small Data Transmission rejection message for use in the control of the mobile radio communications device if Small Data Transmission is to be rejected.

(Supplementary Note 2)

The mobile radio communications network as claimed in Supplementary note 1 and wherein the said first network device comprises a SGSN/MME.

(Supplementary Note 3)

The mobile radio communications network as claimed in Supplementary note 1 or 2, wherein the said second network device comprises a server device.

(Supplementary Note 4)
The mobile radio communications network as claimed in Supplementary note 3, wherein the server comprises a Home Subscriber Server.

(Supplementary Note 5)
The mobile radio communications network as claimed in any one of Supplementary notes 1 to 4, wherein the first network device is arranged to determine if Small Data Transmission should be prevented responsive to its signalling exchange with the said second network device.

(Supplementary Note 6)
The mobile radio communications network as claimed in Supplementary note 5 and arranged such that the said signalling exchange between the first network device and second network device as part of the said establishment procedure comprises an interrogation signal sent from the first network device to the second network device.

(Supplementary Note 7)
The mobile radio communications network as claimed in any one of Supplementary notes 1 to 6 and arranged such that the Small Data Transmission rejection message is sent directly from the said first network device to the mobile radio communications device.

(Supplementary Note 8)
The mobile radio communications network as claimed in Supplementary note 1 and wherein the said first network device comprises an MTC-IWF device.

(Supplementary Note 9)
The mobile radio communications network as claimed in Supplementary note 8 and wherein the said second network device comprises a server device.

(Supplementary Note 10)
The mobile radio communications network as claimed in Supplementary note 9 and wherein the server comprises a Service Capability Server/Application Server.

(Supplementary Note 11)
The mobile radio communications network as claimed in any one of Supplementary notes 8, 9 and 10, wherein the first network device is arranged to determine if Small Data Transmission should be prevented responsive to its signalling exchange with the said second network device.

(Supplementary Note 12)
The mobile radio communications network as claimed in Supplementary note 11 and arranged such that the signalling exchange between the first and second network devices comprises authorizing/authentication signalling between the MTC-IWF and the SCS/AS.

(Supplementary Note 13)
The mobile radio communications network as claimed in Supplementary note 11 or 12 and wherein, the said second network device comprises a Home Subscriber Server.

(Supplementary Note 14)
The mobile radio communications network as claimed in Supplementary note 13 and arranged such that the said signalling exchange between the first and second network devices comprises interrogation signalling directed to the Home Subscriber Server.

(Supplementary Note 15)
The mobile radio communications network as claimed in any one of Supplementary notes 8 to 14 and arranged to deliver the Small Data Transmission rejection message from the MTC-IWF device to the mobile radio communications device by way of a further network device.

(Supplementary Note 16)
The mobile radio communications network as claimed in Supplementary note 15, wherein the said further network device comprises an SGSN/MME.

(Supplementary Note 17)
The mobile radio communications network as claimed in any one of Supplementary notes 1 to 16 and arranged such that the Small Data Transmission rejection message includes an indication of the cause of rejection.

(Supplementary Note 18)
The mobile radio communications network as claimed in Supplementary note 17 and arranged such that the cause of rejection indication indicates one of subscription related cause or a non-subscription related cause.

(Supplementary Note 19)
The mobile radio communications network as claimed in any one of Supplementary notes 1 to 18 and arranged such that the said Small Data Transmission rejection message received at the mobile radio communications device includes time-period information serving to control a length of time for which a mobile radio communications device cannot access the Small Data Transmission feature.

(Supplementary Note 20)
The mobile radio communications network as claimed in any one of Supplementary notes 1 to 19, and arranged such that the Small Data Transmission rejection message received at the mobile radio communications device includes a Small Data Transmission identifier to differentiate between different Small Data Transmission procedures within an application.

(Supplementary Note 21)
The mobile radio communications network as claimed in any one of Supplementary notes 1 to 20, and arranged such that a transfer reject message is initiated in the mobile radio communications device, responsive to the said Small Data Transmission rejection message, and for control to an Application within the mobile radio communications device.

(Supplementary Note 22)
The mobile radio communications network as claimed in Supplementary note 21, wherein the transfer reject message includes at least one of an indication of cause of rejection, time-period information serving to control a length of time of preventing access of the mobile radio communications device to the Small Data Transmission feature, and a Small Data Transmission identifier.

(Supplementary Note 23)
A method of controlling use of a Small Data Transmission feature within a mobile radio communications network within which a mobile radio communications device is to operate with access to a Small Data Transmission feature, the method including the steps of receiving at a first network device Small Data Transmission signalling initiated by the mobile radio communications device, receiving at a second network device signalling from the said first network device as part of an establishment procedure for attempted Small Data Transmission communications for the mobile radio communications device in the network, by determining at the first network device if Small Data Transmission should be prevented for the mobile radio communications device and initiating a Small Data Transmission rejection message for use in the control of a mobile radio communications device if Small Data Transmission is to be rejected.

(Supplementary Note 24)
The method as claimed in Supplementary note 23, wherein the said first network device employed within the method comprises an SGSN/MME.

(Supplementary Note 25)
The method as claimed in Supplementary note 23 or 24 and wherein the said second network device employed within the method comprises a server device.

(Supplementary Note 26)
The method as claimed in Supplementary note 25 wherein the server device comprises a Home Subscriber Server.

(Supplementary Note 27)
The method as claimed in any one of Supplementary notes 23 to 26, wherein the first network device is arranged to determine if Small Data Transmission should be prevented responsive to its signalling exchange with the said second network device.

(Supplementary Note 28)
The method as claimed in Supplementary note 27 wherein the said signalling exchange between the first network device and second network device as part of the said establishment procedure comprises an interrogation signal sent from the first network device to the second network device.

(Supplementary Note 29)
The method as claimed in any one of Supplementary notes 23 to 28 and including sending the Small Data Transmission rejection message directly from the said first network device to the mobile radio communications device.

(Supplementary Note 30)
The method as claimed in Supplementary note 23 and wherein the said first network device employed by the method comprises an MTC-IWF device.

(Supplementary Note 31)
The method as claimed in Supplementary note 23 and wherein the said second network device employed by the method comprises a server device.

(Supplementary Note 32)
The method as claimed in Supplementary note 31 wherein the said server device comprises a Service Capability Server/Application Server (SCS/AS).

(Supplementary Note 33)
The method as claimed in any one of Supplementary notes 30, 31 and 32, wherein the first network device is arranged to determine if the Small Data Transmission should be prevented responsive to its signalling exchange with the said second network device.

(Supplementary Note 34)
The method as claimed in Supplementary note 34 and wherein the said signalling exchange arising within the network as part of the said establishment procedure comprises authorizing/authentication signalling between the MTC-IWF and the SCS/AS.

(Supplementary Note 35)
The method as claimed in Supplementary note 33 or 34 and wherein the said second network device comprises a Home Subscriber Server.

(Supplementary Note 36)
The method of controlling use of a Small Data Transmission feature within a mobile radio communications network as claimed in Supplementary note 35 wherein the signalling exchange forming part of the said establishment procedure comprises interrogation signalling directed to the Home Subscriber Server.

(Supplementary Note 37)
The method of controlling use of a Small Data Transmission feature within a mobile radio communications network as claimed in any one of Supplementary notes 30 to 36 and including the step of delivering the Small Data Transmission rejection message from the MTC-IWF to the mobile radio communications device by way of a further network device.

(Supplementary Note 38)
The method as claimed in any one of Supplementary notes 30 to 37 wherein the Small Data Transmission rejection message includes an indication of the cause of rejection.

(Supplementary Note 39)
The method as claimed in Supplementary note 38 and including a cause of rejection comprising and indication of at least one of a subscriber-related cause or a non-subscriber related cause.

(Supplementary Note 40)
The method as claimed in any one of Supplementary notes 30 to 39 wherein Small Data Transmission rejection message received at the mobile radio communications device includes time-period information serving to control a length of time for which a mobile radio communications device cannot access the Small Data Transmission feature.

(Supplementary Note 41)
The method as claimed in any one of Supplementary notes 30 to 40, wherein the Small Data Transmission rejection message received at the mobile radio communications device includes a Small Data Transmission identifier serving to differentiate different Small Data Transmission procedures within an application.

(Supplementary Note 42)
The method as claimed in any one of Supplementary notes 30 to 41, and including the step of producing a transfer reject message in the mobile radio communications device, responsive to the said Small Data Transmission rejection message, and for control of an Application within the mobile radio communications device.

(Supplementary Note 43)
The method as claimed in Supplementary note 42, wherein the transfer reject message includes at least one of an indication of cause of rejection, time-period information serving to control a length of time of preventing access of the mobile radio communications device to the Small Data Transmission feature, and a Small Data Transmission identifier.

(Supplementary Note 44)
A mobile radio communications network device arranged to receive Small Data Transmission signalling from a mobile radio communications device and to send signalling to a second mobile radio communications network device as part of an establishment procedure for attempted Small Data Transmission communication for the mobile radio communications device within a network, the said mobile radio communications network device further being arranged to determine if a Small Data Transmission should be prevented for the mobile radio communications device, and to initiate a Small Data Transmission rejection message for use in the control of the mobile radio communications device if Small Data Transmission is to be rejected.

(Supplementary Note 45)
The mobile radio communications network device as claimed in Supplementary note 44 and comprising a SGSN/MME.

(Supplementary Note 46)
The mobile radio communications network device as claimed in Supplementary note 44 or 45, and arranged to determine if Small Data Transmission should be prevented responsive to its signalling exchange with the said second mobile radio communications network device.

(Supplementary Note 47)
The mobile radio communications network device as claimed in Supplementary note 46 and arranged such that the said signalling includes an interrogation signal to the second network device as part of the said signalling exchange.

(Supplementary Note 48)
The mobile radio communications network device as claimed in Supplementary note 46 or 47 and arranged to send the Small Data Transmission rejection message directly to the mobile radio communications device.

(Supplementary Note 49)
The mobile radio communications network device as claimed in Supplementary note 46 and comprising an MTC-IWF device.

(Supplementary Note 50)
The mobile radio communications network device as claimed in Supplementary note 49 and arranged such that the said signalling exchange between the mobile radio communication network devices comprises authorizing/authentication signalling between the MTC-IWF and a SCS/AS.

(Supplementary Note 51)
The mobile radio communications network device as claimed in Supplementary note 49 and arranged such that the said signalling exchange between the mobile radio communications network devices includes interrogation signalling directed to a Home Subscriber Server within the network.

(Supplementary Note 52)
The mobile radio communications network device as claimed in any one of Supplementary notes 44 to 51, and arranged such that the Small Data Transmission message includes at least one of an indication of cause of rejection, time-period information serving to control a length of time of preventing access of the mobile radio communications device to the Small Data Transmission feature, and a Small Data Transmission identifier.

(Supplementary Note 53)
A method of operating a mobile radio communications network device to receive a Small Data Transmission from a mobile radio communications device operating within a network and with access to a Small Data Transmission service, the method including the step of receiving Small Data Transmission signalling initiated by the mobile radio communications device, sending, as part of a signalling exchange, signalling to a second mobile radio communications network device as part of the establishment procedure for attempted Small Data Transmission communication for the mobile radio communications device, determining if the Small Data Transmission should be prevented for the mobile radio communications device and initiating a Small Data Transmission rejection message for use in the control of the mobile radio communication device if Small Data Transmission is to be rejected.

(Supplementary Note 54)
The method of operating a mobile radio communications device as claimed in Supplementary note 53, wherein the said determination if Small Data Transmission should be prevented occurs responsive to the said signalling exchange.

(Supplementary Note 55)
The method of operating a mobile radio communications device as claimed in Supplementary note 54 wherein the said signalling exchange within the method between the network devices comprises an interrogation signal sent from the said mobile radio communications network device to the said second mobile radio communications network device.

(Supplementary Note 56)
The method of operating a mobile radio communications device as claimed in Supplementary note 54 and wherein the said signalling exchange can comprise interrogation signalling directed to an HSS.

(Supplementary Note 57)
The method of operating a mobile radio communications device as claimed in any one of Supplementary notes 53 to 56 and wherein the said Small Data Transmission rejection message is sent directly from the said first network device to the mobile radio communications device.

(Supplementary Note 58)
The method of operating a mobile radio communications device as claimed in Supplementary note 54 wherein the said signalling exchange arising in relation to the method within the network comprises an authorizing/authentication signalling exchange.

(Supplementary Note 59)
The method of operating a mobile radio communications network device as claimed in any one of Supplementary notes 53 to 58, wherein the Small Data Transmission message includes at least one of an indication of cause of rejection, time-period information serving to control a length of time of preventing access of the mobile radio communications device to the Small Data Transmission feature, and a Small Data Transmission identifier.

(Supplementary Note 60)
A mobile radio communications device arranged to receive a Small Data Transmission rejection message from the mobile radio communications network device of any one of Supplementary notes 44 to 52.

(Supplementary Note 61)
A mobile radio communications network substantially as hereinafter described with reference to any one or more of FIGS. 3 to 7 of the accompanying drawings.

(Supplementary Note 62)
A method of controlling use of a Small Data Transmission feature within a mobile radio communications network substantially as hereinafter described with reference to any one or more of FIGS. 3 to 7 of the accompanying drawings.

(Supplementary Note 63)
A mobile radio communications network device substantially as hereinafter described with reference to any one or more of FIGS. 3 to 7 of the accompanying drawings.

(Supplementary Note 64)
A method of operating a mobile radio communications device substantially as hereinafter described with reference to any one or more of FIGS. 3 to 7 of the accompanying drawings.

This application is based upon and claims the benefit of priority from United Kingdom Patent Application No. 1318901.4, filed on Oct. 25, 2013, the disclosure of which is incorporated herein in its entirety by reference.

REFERENCE SIGNS LIST

| | |
|---|---|
| 10 | mobile radio communications network |
| 12, 62, 90, 110, 132 | UE |
| 14 | MME |
| 16 | MTC-IWF |
| 18 | SCS |
| 20 | AS |
| 26 | application layer |
| 28 | SDT user layer |
| 30, 54 | SDT layer |
| 32, 34 | NAS layer |
| 36, 38 | T5 interface Application Protocol layer |
| 40, 42 | Tsp interface Application Protocol layer |
| 44, 46 | TCP layer |
| 48 | application layer |
| 50 | HTTP layer |
| 52, 56 | TLS layer |
| 60, 88, 108, 130 | network environment |
| 64, 92, 112, 134 | application |
| 66, 94, 114, 136 | SGSN/MME |
| 68, 116, 138 | MTC-IWF |
| 70 | SCS/AS |

-continued

| | |
|---|---|
| 96, 140 | HSS |
| 156 | device |
| 158 | transmission/reception circuitry |
| 160 | interface functionality |
| 162 | authentication/interrogation functionality |
| 164 | SDT objection message initiator |
| 166 | controller |

The invention claimed is:

1. A mobile radio communications network within which a mobile radio communications device is configured to operate with access to a Small Data Transmission feature, the mobile radio communications network comprising:
  a first network device configured to receive Small Data Transmission signalling initiated by the mobile radio communications device, and
  a second network device configured to receive signalling from the first network device as part of an establishment procedure for attempted Small Data Transmission communications for the mobile radio communications device within the network,
  wherein the first network device is further configured to
    determine if Small Data Transmission should be prevented for the mobile radio communications device based on an authentication result of a Service Capability Server/Application Server (SCS/AS), and
    initiate a Small Data Transmission rejection message for use in the control of the mobile radio communications device if Small Data Transmission is to be rejected.

2. The mobile radio communications network of claim 1, wherein the first network device comprises a Machine Type Communication Interworking Function (MTC-IWF) device.

3. The mobile radio communications network of claim 2, wherein the first network device is further configured to deliver the Small Data Transmission rejection message from the MTC-IWF device to the mobile radio communications device by way of a third network device.

4. The mobile radio communications network of claim 3, wherein the third network device comprises a Serving General Packet Radio Service (GPRS) Support Node/Mobility Management Entity (SGSN/MME).

5. The mobile radio communications network of claim 1, wherein the Small Data Transmission rejection message includes an indication of a cause of rejection.

6. The mobile radio communications network of claim 5, wherein the indication of the cause of rejection indicates one of a subscription related cause or a non-subscription related cause.

7. The mobile radio communications network of claim 1, wherein the Small Data Transmission rejection message received at the mobile radio communications device includes time-period information serving to control a length of time for which a mobile radio communications device cannot access the Small Data Transmission feature.

8. The mobile radio communications network of claim 1, wherein the Small Data Transmission rejection message received at the mobile radio communications device includes a Small Data Transmission identifier to differentiate between different Small Data Transmission procedures within an application.

9. The mobile radio communications network of claim 1, wherein a transfer reject message is initiated in the mobile radio communications device, responsive to the Small Data Transmission rejection message, and for control of an application within the mobile radio communications device.

10. The mobile radio communications network of claim 9, wherein the transfer reject message includes at least one of:
  an indication of a cause of rejection,
  time-period information serving to control a length of time of preventing access of the mobile radio communications device to the Small Data Transmission feature, and
  a Small Data Transmission identifier.

11. A mobile radio communications network device configured to:
  receive Small Data Transmission signalling from a mobile radio communications device, and
  send signalling to another mobile radio communications network device as part of an establishment procedure for attempted Small Data Transmission communication for the mobile radio communications device within a network,
  wherein the mobile radio communications network device is further configured to
    determine if a Small Data Transmission should be prevented for the mobile radio communications device based on an authentication result of a Service Capability Server/Application Server (SCS/AS), and
    initiate a Small Data Transmission rejection message for use in the control of the mobile radio communications device if Small Data Transmission is to be rejected.

12. The mobile radio communications network device of claim 11, comprising a Serving General Packet Radio Service (GPRS) Support Node/Mobility Management Entity (SGSN/MME).

13. The mobile radio communications network device of claim 11, wherein the mobile radio communications network device is further configured to determine if Small Data Transmission should be prevented responsive to its signalling exchange with the another mobile radio communications network device.

14. The mobile radio communications network device of claim 13,
  wherein the said signalling includes an interrogation signal to the another mobile radio communications network device as part of the signalling exchange.

15. The mobile radio communications network device of claim 13, wherein the mobile radio communications network device is further configured to
  send the Small Data Transmission rejection message directly to the mobile radio communications device.

16. The mobile radio communications network device of claim 13, comprising a Machine Type Communication Interworking Function (MTC-IWF) device.

17. The mobile radio communications network device of claim 16,
  wherein the signalling exchange between the mobile radio communication network devices comprises authorizing/authentication signalling between the MTC-IWF and the SCS/AS.

18. The mobile radio communications network device of claim 16, wherein the signalling exchange between the mobile radio communications network devices includes interrogation signalling directed to a Home Subscriber Server within the network.

19. The mobile radio communications network of claim 11,
wherein the Small Data Transmission rejection message includes at least one of:
an indication of a cause of rejection,
time-period information serving to control a length of time of preventing access of the mobile radio communications device to the Small Data Transmission feature, and
a Small Data Transmission identifier.

20. A method of operating a first mobile radio communications network device to receive a Small Data Transmission from a mobile radio communications device operating within a network and with access to a Small Data Transmission service, the method including:
receiving Small Data Transmission signalling initiated by the mobile radio communications device,
sending, as part of a signalling exchange, signalling to a second mobile radio communications network device as part of the establishment procedure for attempted Small Data Transmission communication for the mobile radio communications device,
determining if the Small Data Transmission should be prevented for the mobile radio communications device based on an authentication result of a Service Capability Server/Application Server (SCS/AS), and
initiating a Small Data Transmission rejection message for use in the control of the mobile radio communication device if Small Data Transmission is to be rejected.

* * * * *